United States Patent [19]

Kozlowski

[11] Patent Number: 5,411,346
[45] Date of Patent: May 2, 1995

[54] BLIND CABLE TIE CUTOUT

[75] Inventor: Mark Kozlowski, Muncie, Ind.

[73] Assignee: Siemens Stromberg-Carlson, Boca Raton, Fla.

[21] Appl. No.: 67,313

[22] Filed: May 26, 1993

[51] Int. Cl.⁶ .............................................. F16B 5/00
[52] U.S. Cl. ........................................ 403/6; 403/392; 248/74.3
[58] Field of Search ............ 24/16 PB, 129 B, 30.5 P; 403/6, 392; 248/74.3, 69

[56] References Cited

U.S. PATENT DOCUMENTS 4,524,937  6/1985  Zizan ................................. 248/74.3

Primary Examiner—Richard A. Bertsch
Assistant Examiner—William J. Wicker
Attorney, Agent, or Firm—Joseph S. Codispoti

[57] ABSTRACT

A cutout is formed through a panel for providing a closed slot or channel surrounding a cleat having a tee shape, for receiving a midportion of a tie wrap inserted through the slot on one side of the panel to a position over a narrowed neck portion of the cleat, thereby permitting a component placed over the cleat on the one side of the panel to be secured thereto by tightening the tie wrap around both the cleat and the component, without requiring access to both sides of the panel.

14 Claims, 3 Drawing Sheets

BLIND CABLE TIE CUTOUT

FIELD OF THE INVENTION

The field of the present invention relates generally to methods and apparatus for securing cables and other items to panels, pipes, and other surfaces, and more particularly relates to methods and apparatus for securing cables or harnesses, and similar items, to surfaces where rear access to the surface is not available.

BACKGROUND OF THE INVENTION

Many techniques are known in the prior art to secure components such as electrical cables, conduits, and other such items to a surface such as a panel, an outside wall of a cabinet, a wall, a large conduit, and so forth. One method uses a cable clamp, for clamping a cable or conduit to a panel, for example, by drilling a hole through the panel and securing the clamp over the cable or conduit through use of self-tapping screws. Another method is to drill a plurality of spaced apart holes at different levels on the panel where a cable is to be secured along the panel, for example, and where access to the rear of the panel is obtainable. Cable ties are threaded through the holes, whereby the initially open ends of the cable ties protrude through the associated pair of holes out of the front of the panel. The cable or conduit, for example, is positioned between the pair of holes, and the cable tie secured about the cable or conduit to fix the cable or conduit to the panel. Other methods and apparatus for securing electrical cables, for example, to a surface where rear access is unavailable, includes the use of a narrow bracket secured to the front of the panel via standoffs, whereby the cables are slipped beneath the bracket, and tie wraps are threaded through pairs of holes drilled through the bracket for securing the cables to the bracket, and holding them in position on the panel.

All of the known methods and apparatus for securing items such as electrical cable to a surface require added assembly time for threading cable ties through pairs of holes, in applications where rear access to the panel can be provided, or extra assembly parts are required such as brackets for securing the cables to a panel where rear access is not provided.

SUMMARY OF THE INVENTION

With the problems in the prior art in mind, one object of the invention is to provide a method and apparatus for securing electrical cables and other components to a surface such as a panel, without requiring access to the rear of the panel.

Another object of the invention is to provide a method and apparatus for permitting cables or other items to be secured to a surface through use of cable ties or tie wraps, without requiring access to the opposite side of the surface or panel, and without requiring any additional hardware.

With these and other objects in mind, the present invention includes providing a cutout through a panel or other surface to which components such as cables are to be mounted, whereby the cutout is shaped to include a centrally located cleat or tee-like member surrounded by a closed slot. In one embodiment of the invention, an electrical cable is centrally positioned along the longitudinal axis of the cutout, and a cable tie is slipped under the cable, through the closed slot of the cutout, and positioned around the neck of the cleat, whereafter the ends of the cable tie are secured together around the cable for securing the cable to the panel. In a similar manner, such cutouts can be provided through other than flat surfaces such as panels, for example, through the outside wall of a large conduit, for permitting cables or other items to be secured to the conduit.

BRIEF DESCRIPTION OF THE DRAWINGS

A detailed description of the various embodiments of the invention is given below with reference to the accompanying drawings, in which like items are identified by the same reference designation, in which.

DETAILED DESCRIPTION OF THE INVENTION

Figure 1:
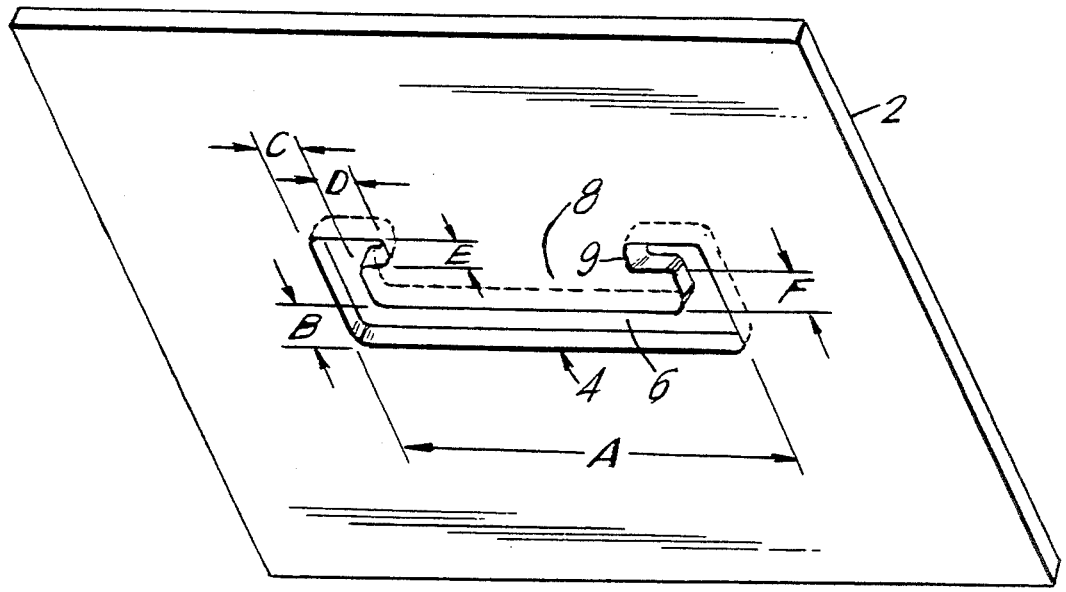
FIG. 1 shows a flat panel through which a cutout configuration of one embodiment of the invention has been made.

In FIG. 1, a portion of a flat panel 2, in this example, includes a cutout configuration 4 of one embodiment of the invention. The cutout portion 4 includes a closed ended slot or channel 6 surrounding the circumference of a remaining portion of panel 2 for providing a cleat or tee-shaped member 8, as shown. If a cable 10 is to be mounted or secured to the panel 2, as shown in FIGS. 2–5, the dimension "A" is determined by the cable size or outside diameter, cable type, and the desired cable orientation upon the panel Similarly, the other dimensions shown, namely "B", "C", "D", "E", and/or "F", are selected depending upon the particular application. Also, the size of the cable ties used will affect the dimensioning of the cutout 4. It is preferred that the neck 9 of cleat 8 be slightly longer than the width of an associated cable tie 12.

Figure 2:
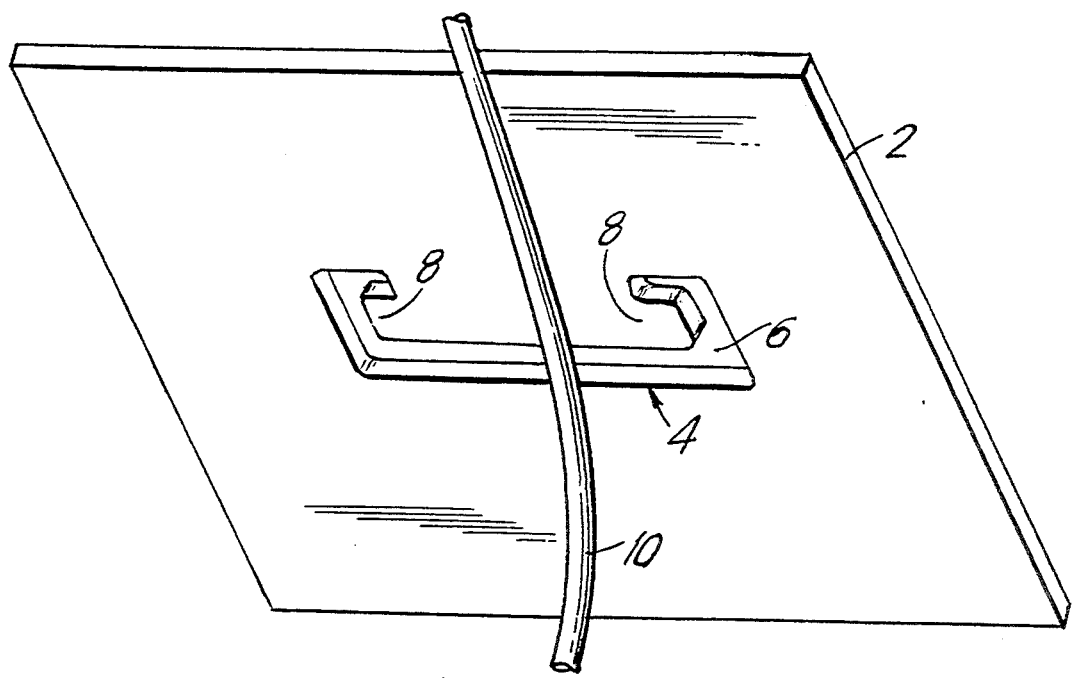
FIG. 2 shows an electrical cable positioned over the cutout portion of the panel of FIG. 1.

An example of the manner in using the embodiment of the invention of FIG. 1 will now be given with reference to FIGS. 2 through 5. In this example, a cable 10 is illustrated for mounting upon the panel 2. However, the invention is not limited to mounting cables upon a panel, and may be used for mounting any components or items upon a panel that are capable of being held to the panel or other surface through use of tie wraps or cable wraps, or other strap-like securing means. As shown in FIG. 2, a cable 10 is laid against the panel so it is oriented substantially along the longitudinal axis of the cleat or tee 8 in about the middle of the cutout 4, as shown.

Figure 3:
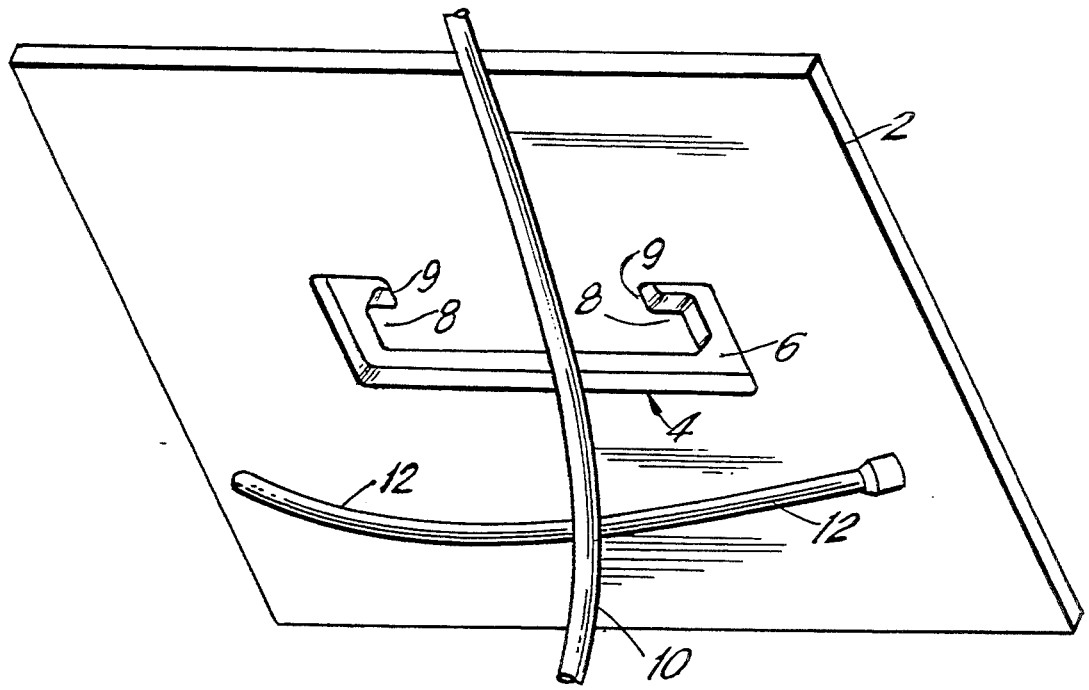
FIG. 3 shows a cable tie slipped under the electrical cable positioned over the cutout of the panel of FIG. 1, preparatory to securing the cable to the panel.
Figure 4:
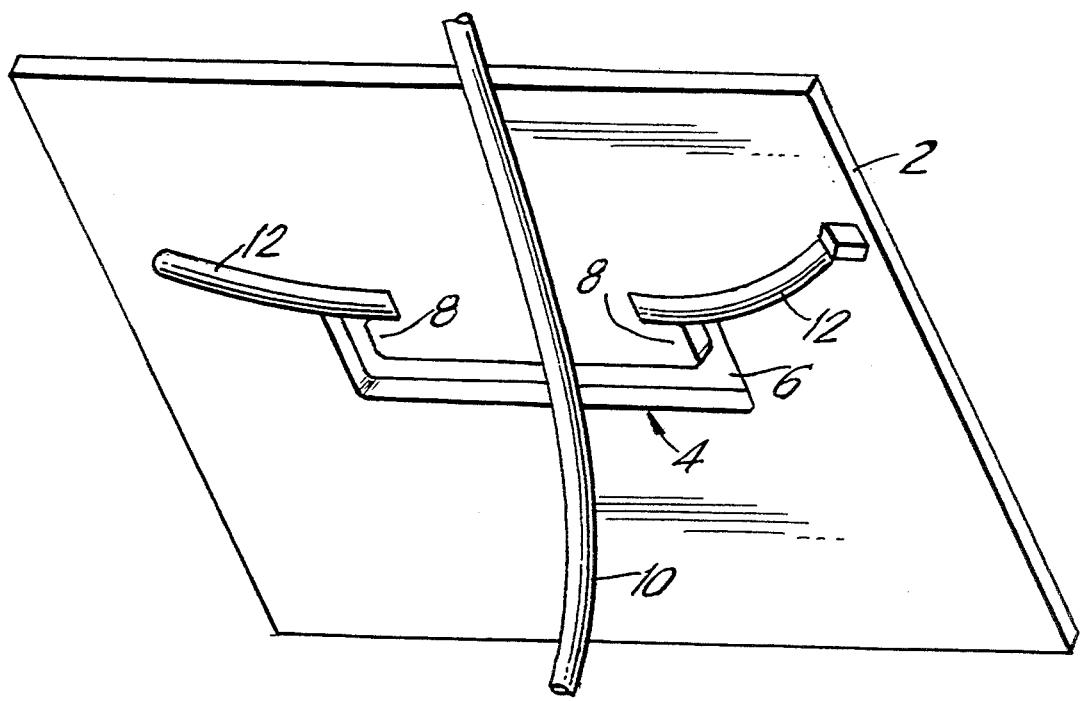
FIG. 4 shows a cable tie in position partially around the cleat or tee portion of the cutout through the panel of FIG. 1, preparatory to securing an electrical cable to the panel.
Figure 5:
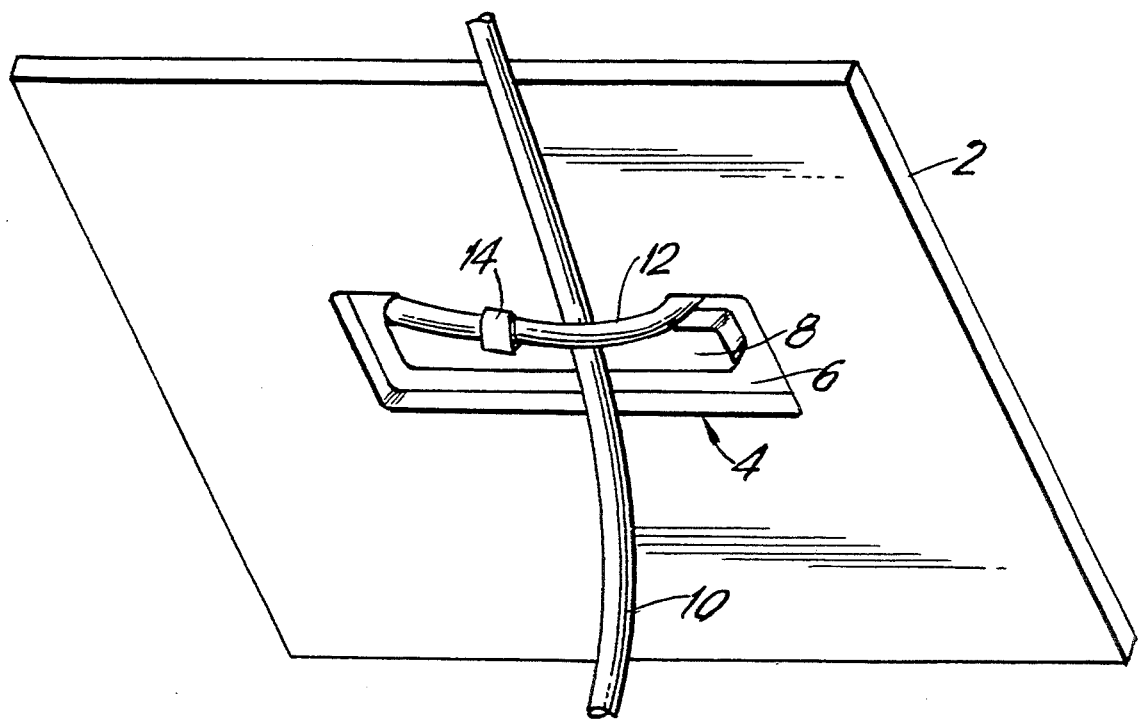
FIG. 5 shows the cable tie secured in place around the cable and cleat or tee-shaped portion of the cutout through the panel of FIG. 1, for retaining the electrical cable in place on the panel.

The next step is to slip a tie wrap or cable wrap 12 under the cable 10, as shown in FIG. 3. The cable wrap or tie wrap 12 is then slid to the closed ended channel or slotway 6 and pushed partly through the slot 6 so that a central portion of the tie wrap 12 is located on the cleat or tee 8 around a neck portion 9 thereof. The ends of the tie wrap 12 protrude from the mounting side of panel 2 as shown in FIG. 4. The next step is to secure the ends of the tie wrap 12 together for retention via the cable tie retention head 14 of the tie wrap 12, while pulling the ends of the tie wrap 12 as closely together as possible, for substantially retaining the cable 10 at the desired position on panel 2, as shown in FIG. 5.

Figure 6:
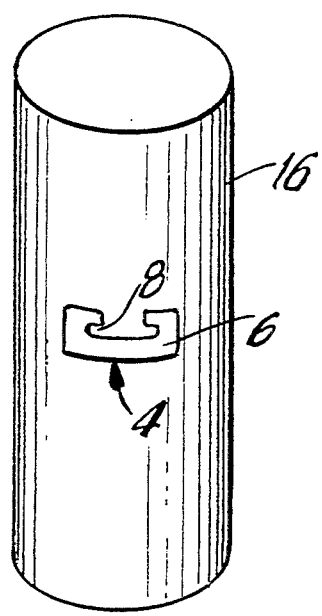
FIG. 6 shows another embodiment of the invention for providing a cutout through a circular conduit, or other curved surface, for securing items to the conduit.

The embodiment of the invention illustrated incorporating the cutout 4 is not limited for use with flat panels 2, but can be used through many other surfaces to which a cable or some other component is to be affixed. For example, in FIG. 6, a circular conduit 16 is shown with a cutout 4 through its outside wall, for permitting a cable 10 to be affixed thereto through use of a tie wrap or cable wrap 12, as described in FIGS. 2 through 5 for the flat panel 2.

The present invention can be applied for use with existing equipment, by modifying the equipment to provide a necessary number of cutouts 4, dimensioned as required, for permitting greater facility in use of the equipment for securing electrical cables or other components to the outside surfaces of the equipment, such as electronic equipment housings, switching gear housings, and so forth. Also, the cutouts 4 can be fabricated in various cabinets, panels, tubing, and so forth, at the time of fabrication thereof through use of punching machines, CNC machines, and so forth. Through use of the inventive cutouts, cable mounting parts such as cable clamps, mounting screws, and so forth will be eliminated, in concert with reducing required assembly time. As indicated above, the cutouts 4 of the illustrated embodiment of the invention can be used in conjunction with a variety of differently shaped surfaces through which such a cutout 4 can readily be fabricated, for facilitating the mounting of components on the associated surface through use of cable wraps or tie wraps 12, or similar mounting straps known in the art, without requiring access to the opposite side of the mounting surface.

Although various embodiments of the invention have been shown and illustrated herein, they are not meant to be limiting, and those of skill in the art may recognize various modifications to these embodiments. It is intended that any such modifications be covered by the spirit and scope of the claims appended hereto. For example, in mounting a component on one side of a panel including cutouts 4, first tie wraps or cable ties 12 can be inserted via a midportion through an associated slot 6, and over a cleat 8 on the neck 9 thereof. Next a component, such as a cable 10 can then be positioned over the cleat 8 between the ends of tie wrap 12 as shown in FIG. 4. The tie wrap 12 is then secured around cable 10 and cleat 8 for fixing cable 10 to panel 2.

What is claimed is:

1. A blind cable tie for permitting tie wraps or tie straps to be secured to a mounting surface without requiring access to the opposite side of the mounting surface, for in turn securing components to the mounting surface, comprising:
   a cleat having a neck and arms that project from one end of the neck and that are surrounded by a closed channel or slot, said cleat being formed in the mounting surface in coplanar fashion;
   said channel or slot permitting a midportion of said tie strap to be partially pushed through one side of said mounting surface and slid into a position partially around an opposite side of said cleat, whereafter the ends of said tie strap protruding from said mounting surface are wrapped tightly around a component positioned proximate said cleat and connected together, for securing the component to the mounting surface without requiring access to the opposite side of said mounting surface.

2. The blind cable tie of claim 1, wherein said cleat is tee shaped.

3. The blind cable tie of claim 1, wherein said cleat is tee shaped, and includes a narrowed neck for receiving and retaining a portion of said tie strap.

4. A method for securing components to a mounting surface using tie straps, without requiring access to the opposite side of the mounting surface, said method comprising the steps of:
   forming a cutout through said mounting surface at a location where a component is to be secured to said mounting surface;
   shaping said cutout to include a cleat having a neck and arms that project from one end of the neck and that are surrounded by a closed slot or channel;
   inserting a midportion of a tie strap through said slot on one side of said mounting surface;
   sliding the midportion of said tie strap around said cleat on an opposite side of said mounting surface, with the free ends of said tie strap protruding from the one side of said mounting surface;
   positioning a component to be mounted between the ends of said tie strap over said cutout; and
   wrapping said tie strap tightly around said component, and securing the ends of said tie strap together to fix said component to said cleat on the one side of said mounting surface, without requiring access to the opposite side of said mounting surface.

5. The method of claim 4, further comprising the steps of:
   repeating said forming and shaping steps for providing a plurality of shaped cutouts through said mounting surface at positions thereon where components may be secured thereto.

6. The method of claim 4, wherein said shaping step includes providing a tee-shaped cleat having a narrowed neck for receiving said tie strap.

7. The method of claim 6, wherein said neck of said tee-shaped cleat is made slightly longer than the width of said tie strap.

8. The method of claim 6, further comprising the steps of:
   repeating said forming and shaping steps for providing a plurality of shaped cutouts through said mounting surface at positions thereon where components may be secured thereto.

9. The method of claim 7, wherein said neck of said tee-shaped cleat is made slightly longer than the width of said tie strap.

10. A tie wrap retainer mechanism for a panel requiring access to only one side of the panel for securing a component to the panel via use of said tie wrap, comprising a cleat shaped member formed by a cutout through said panel, said cleat being partially surrounded by a closed-ended slot for permitting a midportion of a tie wrap to be slid through said slot for installation on said cleat on an opposite side of said panel thereafter permitting a component placed over said cleat between protruding ends of said tie wrap, to be secured to the one side of said panel by tying said tie wrap tightly around said component and cleat.

11. The tie wrap retainer mechanism of claim 10, wherein said cleat comprises a tee shaped member having a narrowed neck for receiving a portion of said tie strap.

12. The tie wrap retainer mechanism of claim 11, wherein said neck is slightly larger than the width of said tie wrap.

13. A blind cable tie mechanism for a mounting surface, comprising:

a tee-shaped cleat formed by a cutout through said mounting surface, said cutout being shaped to provide a closed-ended slot surrounding the arms of said cleat;

said cleat and slot permitting a midportion of a cable tie to be inserted through said slot on one side of said mounting surface, and slid over said cleat on the opposite side of said mounting surface, whereafter a component placed over the cleat on the one side of said mounting surface is secured thereto by tightening the cable tie around both said cleat and the component, without requiring access to an opposite side of said mounting surface.

14. The blind cable tie mechanism of claim 13, wherein said cleat includes a narrowed neck portion dimensioned to be slightly wider than the width of said cable tie.

* * * * *